Oct. 27, 1959 D. H. FISHER 2,910,533

TELEVISION RECEIVERS

Filed Dec. 15, 1955

Inventor
Donald H. Fisher
By
Holcombe, Wetherill & Brisebois
Attorneys 2,910,533
Patented Oct. 27, 1959

2,910,533

TELEVISION RECEIVERS

Donald Henry Fisher, Cambridge, England, assignor to Pye Limited, Cambridge, England, a British company Application December 15, 1955, Serial No. 553,372

Claims priority, application Great Britain December 23, 1954

7 Claims. (Cl. 178—7.5)

Figure 1:
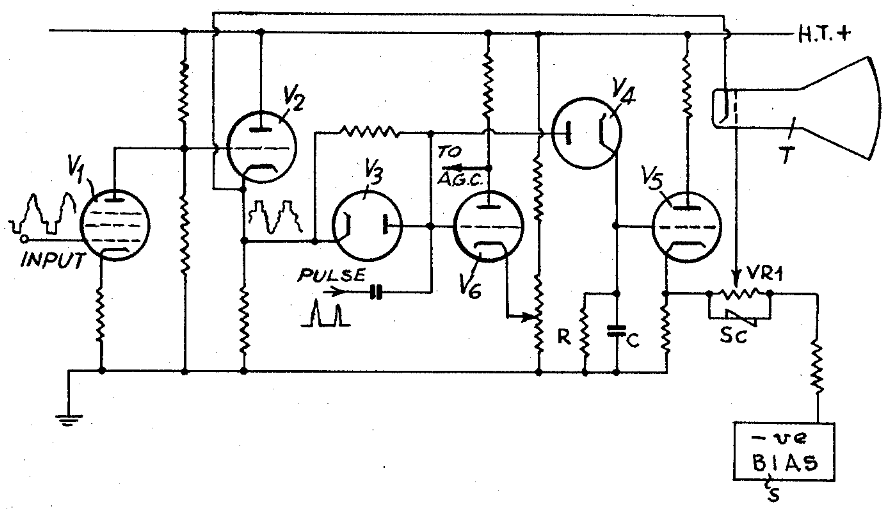

The present invention relates to television receivers and more particularly to such receivers which are adapted to operate on a television system employing negative modulation of the video signal on the carrier frequency, i.e. a change of the video component towards white reduces the amplitude of the carrier. Negative modulation is employed in the United States 525 line system and in the 625 line international television system.

In receivers designed for negative modulation, if the video amplifier is D.C. connected to the modulating electrode of the reproducing cathode ray tube, the raster returns to peak white when the signal is removed. This introduces difficulties in various parts of the set and also causes annoyance to viewers. In order to overcome this disadvantage A.C. coupling has been employed between the video amplifier and the cathode ray tube but this is not a desirable solution, and in certain systems such as the N.T.S.C. type colour systems, may in fact be very undesirable.

It is an object of the present invention to provide an arrangement in which the black level on the cathode ray tube can be substantially maintained.

According to the present invention, during periods when a television signal is being received, a bias is applied to the grid or cathode of the cathode ray tube which bias is proportional to the black level of the received signal.

According to a feature of the invention, the output from the video amplifier is D.C. connected to the modulating electrode of the cathode ray tube and the tube is biased so that when no signal is being received the scanning beam is just cut-off, and means are provided for sampling the video signals fed to the cathode ray tube during the black level periods and for producing a voltage proportional to the black level of the video signals, which voltage is applied to the grid or cathode of the cathode ray tube as an additional bias which varies the effective bias on the tube during the period when the video signal is applied thereto.

Thus, with the arrangement according to the invention, under no-signal conditions the standing D.C. bias on the cathode ray tube cuts-off the scanning beam and prevents a light raster from appearing on the screen of the cathode ray tube, i.e. the tube is effectively maintained substantially at the black level. When a video signal is received and applied to the grid or cathode of the cathode ray tube, a bias proportional to the black level of the received signal is derived therefrom and is also applied to the grid or cathode of the cathode ray tube in such relationship to the video signal that during black portions of the video signal the effective bias level on the tube is maintained substantially unaltered, but during white-going portions of the video signal the effective bias is decreased so as to produce a light image on the screen of the cathode ray tube which is proportional to the amplitude of the video signal.

The means for producing a voltage proportional to the black level may comprise a circuit similar to the automatic gain control circuit disclosed in the specification of co-pending application Serial No. 407,106 in which the black level of the complete television signal is sampled by means of sampling pulses derived, for example, from the line time base circuit of the receiver, and the output pulses from the sampling rectifier are rectified to produce a voltage proportional to the black level voltage.

The output from the video amplifier may be applied either to the cathode or to the grid of the cathode ray tube and the bias proportional to the black level voltage may be applied to the same electrode as the output from the video amplifier or to the other one of said grid or cathode.

Figure 2:
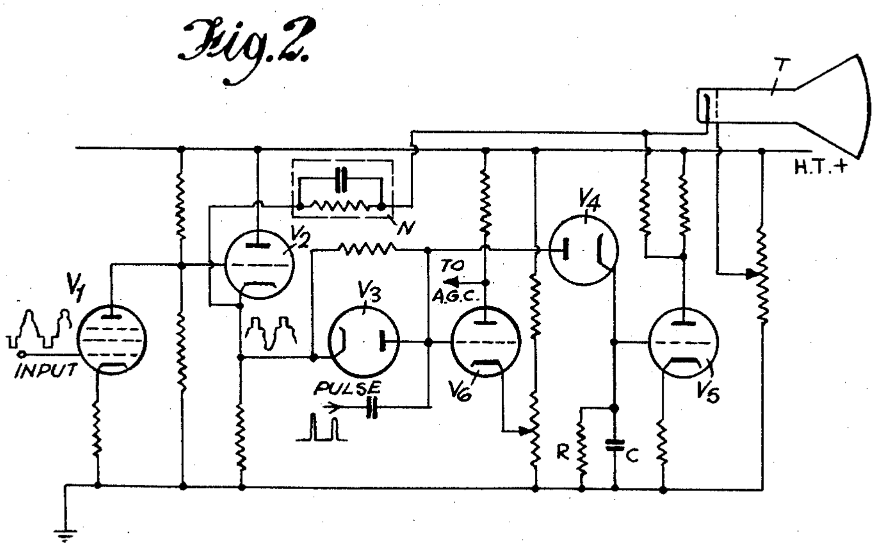

In order that the invention may be more fully understood, reference will now be made to the accompanying drawing, in which, Figure 1 is a circuit diagram of part of a television receiver showing one arrangement according to the invention and, Figure 2 shows a modified circuit arrangement.

Referring to Figure 1, the output from video amplifier valve V1 is applied through a triode cathode follower V2 to the cathode of a cathode ray tube T. A D.C. negative bias is applied to the grid of the cathode ray tube from the bias source S through the potentiometer VR1 which serves as a brightness control. According to the present invention, the video signal at the cathode of valve V2 is also applied to the cathode of the sampling rectifier V3 which is rendered conducting by sampling pulses applied to its anode during the black level period after each line synchronising pulse to sample the video waveform during that period. The sampling pulses may be derived from the line time base circuit. The output from the anode of diode V3 is applied to the anode of diode V4 where the sampled signals are rectified and the output is smoothed by the time constant circuit RC. Thus the voltage at the cathode of diode V4, when a video signal is being received, is proportional to the black level voltage of the video waveform and this voltage is connected to the grid of the cathode ray tube via the cathode follower V5, which offers a low impedance supply, and the bias line from the source S.

In operation, the potentiometer VR1 is set under no-signal condition so that the standing D.C. negative bias on the grid of the tube just cuts-off the scanning beam in order to prevent a light raster from appearing on the screen thereof, thus effectively maintaining the tube substantially at black level. When a video signal is received, this is applied to the cathode of the cathode ray tube with the more positive portions of the signal representing black. The video signal is sampled during the black level periods, as mentioned above by sampling pulses derived from the line time base in order to produce at the output of rectifier V4 a positive D.C. bias proportional to black level of the received signal which is applied to the grid of the cathode ray tube. The relationship between the video signal applied to the cathode of the cathode ray tube and the positive bias proportional to black level applied to the grid of the cathode ray tube is such that during the black portions of the video signal, when the cathode of the cathode ray tube T goes positive, the grid will also go positive by a similar amount due to the bias proportional to black level. During white-going portions of the video signal however, whilst the grid is maintained at substantially the same potential by the bias proportional to black level, the voltage at the cathode of the cathode ray tube will be negative-going whereby the effective negative bias on the grid of the tube is decreased, thus allowing the scanning beam to produce a light image on the screen of the cathode ray tube which is proportional to the amplitude of the white-going portion of the video signal.

It will thus be seen that the arrangement described avoids the undesirable effect of the raster on the cathode ray tube returning to peak white when the video signal is removed, whilst allowing the video amplifier to be D.C. connected to the tube, and a level is maintained on the tube substantially equivalent to black level.

In the circuit of Figure 1, the output from diode V3 is also shown connected to the grid of a triode amplifier V6, which feeds the sampled signals to an automatic gain control voltage rectifier connected to its anode for producing an automatic gain control voltage to be applied to the radio frequency or intermediate frequency amplifiers of the receiver. If desired, a silicon carbide resistor SC may be connected across potentiometer VR1 but this should be omitted if full compensation is necessary.

A modification of the circuit arrangement of Figure 1 is shown in Figure 2 in which the output of the cathode follower V2 is applied to the cathode of the cathode ray tube T through a D.C. loss network N. In this arrangement the bias voltage proportional to black level is derived from the anode of triode V5, and is therefore negative, and this is also applied to the cathode of the cathode ray tube. Therefore, changes at either end of the network N, due on the one hand to the video signal and on the other hand to changes in the bias voltage proportional to black level, oppose each other. The effect of the changes on the effective bias level on the tube is similar to that described with reference to Figure 1.

Whilst particular embodiments have been described it will be understood that various modifications may be made without departing from the scope of this invention. For example, circuit arrangements may be produced in which the input to the video amplifier is reversed. Furthermore, it will be understood that the black level voltage of the signal fed to the cathode ray tube may be sampled at frame frequency instead of at line frequency, provided that the circuit constants are such that the bias proportional to black level can be maintained whilst a video signal is being received.

I claim:

1. In a television receiver adapted to operate on a television system employing negative modulation of the video signal on the carrier frequency, a cathode-ray tube having a grid and a cathode, and at least one electron beam accelerating anode, means for applying a D.C. potential to said at least one anode, a video amplifier, means for feeding a television signal containing a direct current component to said video amplifier, means for D.C. connecting the output of the video amplifier to the cathode of the cathode-ray tube, with the more positive portions of the video signals representing black, means for D.C. biasing the grid of said cathode-ray tube so that when no signal is being received the electron beam of said cathode-ray tube is just cut-off, means for sampling the video signals from the video amplifier during the black level periods of said signals, means including storage means for producing an additional bias voltage proportional to the black level of the video signals from said sampled signals means for feeding said additional bias voltage to the cathode of said cathode-ray tube to operate in opposition to said D.C. grid bias voltage and to vary the effective bias on the tube during the period when the video signal is applied thereto so that the electron beam of said cathode-ray tube can produce a light image on the screen of said cathode-ray tube varying in intensity with the intensity of the video modulation in a direction towards peak white applied to said cathode-ray tube.

2. Apparatus as claimed in claim 1, including an impedance network connected between the output of the video amplifier and the cathode of the cathode ray tube, and means for applying said additional bias voltage between said impedance network and said cathode.

3. In a television receiver adapted to operate on a television system employing negative modulation of the video signal on the carrier frequency, a cathode-ray tube having at least one electron beam modulating electrode, and at least one electron beam accelerating anode, means for applying a D.C. potential to said at least one anode, a video amplifier, means for feeding a television signal containing a direct current component to said video amplifier, means for D.C. connecting the output of the video amplifier to an electron beam modulating electrode of the cathode-ray tube, means for D.C. biasing said cathode-ray tube so that when no signal is being received the electron beam of said cathode ray tube is just cut off, means for sampling the video signals from the video amplifier during the black level periods of said signals, means including storage means for producing an additional bias voltage proportional to the black level of the video signals from said sampled signals and means for feeding said additional bias voltage to said cathode-ray tube to operate in opposition to said D.C. bias voltage and to vary the effective bias on the tube during the period when the video signal is applied thereto so that the electron beam of said cathode-ray tube can produce a light image on the screen of said cathode-ray tube varying in intensity with the intensity of the video modulation in a direction towards peak white applied to said cathode-ray tube.

4. In a television receiver adapted to operate on a television system employing negative modulation of the video signal on the carrier frequency, a cathode-ray tube having a grid and a cathode, and at least one electron beam accelerating anode, means for applying a D.C. potential to said at least one anode, a video amplifier, means for feeding a television signal containing a direct current component to said video amplifier, means for D.C. connecting the output of the video amplifier to the cathode of the cathode-ray tube, with the more positive portions of the video signals representing black, means for D.C. biasing the grid of said cathode-ray tube so that when no signal is being received the electron beam of said cathode-ray tube is just cut-off, means for regularly sampling the video signals from the video amplifier, means including storage means for producing an additional bias voltage proportional to the black-level of the video signals from said sampled signals and means for feeding said additional bias voltage to said cathode-ray tube to operate in opposition to said D.C. bias voltage and to vary the effective bias on the tube during the period when the video signal is applied thereto so that the electron beam of said cathode-ray tube can produce a light image on the screen of said cathode-ray tube varying in intensity with the intensity of the video modulation in a direction towards peak white applied to said cathode-ray tube.

5. In a television receiver adapted to operate on a television system employing negative modulation of the video signal on the carrier frequency, a cathode-ray tube having a grid and a cathode, and at least one electron beam accelerating anode, means for applying a D.C. potential to said at least one anode, a video amplifier, means for feeding a television signal containing a direct current component to said video amplifier, means for D.C. connecting the output of the video amplifier to the cathode of the cathode-ray tube, with the more positive portions of the video signals representing black, means for applying a negative D.C. bias to the grid of said cathode-ray tube so that when no signal is being received the electron beam of said cathode-ray tube is just cut-off, means for sampling the video signals from the video amplifier during the black level periods of said signals, means including storage means for producing an additional positive bias voltage proportional to the black level of the video signals from said sampled signals, a cathode follower, and means for feeding said positive bias voltage through said cathode follower to the grid of said cathode-ray tube to vary the effective bias on the tube during the period when the video signal is applied thereto so that the electron beam of said cathode-ray tube can produce a light image on the screen of said cathode-ray tube varying in intensity with the intensity of the video modulation in a negative direction towards peak white applied to the cathode of said cathode-ray tube.

6. In a television receiver adapted to operate on a television system employing negative modulation of the video signal on the carrier frequency, a cathode-ray tube having a grid and a cathode, and at least one electron beam accelerating anode, means for applying a D.C. potential to said at least one anode, a video amplifier, means for feeding a television signal containing a direct current component to said video amplifier, means for D.C. connecting the output of the video amplifier to the cathode of the cathode-ray tube, with the more positive portions of the video signals representing black, means for applying a negative D.C. bias to the grid of said cathode-ray tube so that when no signal is being received the electron beam of said cathode-ray tube is just cut-off, means for feeding the video signals from the video amplifier to a sampling diode, means for feeding keying pulses to the sampling diode to sample the video signals during the black level periods of said signals, means including storage means for producing an additional and positive bias voltage proportional to the black level of the video signals from said sampled signals, a cathode follower, and means for feeding said positive bias voltage through said cathode follower to the grid of said cathode-ray tube to vary the effective bias on the tube during the period when the video signal is applied thereto so that the electron beam of said cathode-ray tube can produce a light image on the screen of said cathode-ray tube varying in intensity with the intensity of the video modulation in a negative direction towards peak white applied to the cathode of said cathode-ray tube.

7. In a television receiver adapted to operate on a television system employing negative modulation of the video signal on the carrier frequency, a cathode-ray tube having a grid and a cathode, and at least one electron beam accelerating anode, means for applying a D.C. potential to said at least one anode, a video amplifier, means for feeding a television signal containing a direct current component to said video amplifier, means for D.C. connecting the output of the video amplifier to the cathode of the cathode-ray tube, with the more positive portions of the video signals representing black, means for D.C. biasing the grid of said cathode-ray tube so that when no signal is being received the electron beam of said cathode-ray tube is just cut-off, means for feeding the video signals from the video amplifier to a sampling diode, means for feeding keying pulses to the sampling diode to sample the video signals during the black level periods of said signals, means including storage means for producing an additional bias voltage proportional to the black level of the video signals from said sampled signals, an amplifier and means for feeding said additional bias voltage through said amplifier to the cathode of said cathode-ray tube to operate in opposition to the D.C. grid bias voltage and to vary the effective bias on the tube during the period when the video signal is applied thereto so that the electron beam of said cathode-ray tube can produce a light image on the screen of said cathode-ray tube varying in intensity with the intensity of the video modulation in a direction towards peak white applied to said cathode-ray tube.

References Cited in the file of this patent

UNITED STATES PATENTS 2,673,892 Richman ............... Mar. 20, 1954

FOREIGN PATENTS 698,296 Great Britain ........... Oct. 14, 1953